(12) United States Patent
Oshitari et al.

(10) Patent No.: US 11,189,826 B2
(45) Date of Patent: Nov. 30, 2021

(54) ELECTRODE MATERIAL FOR LITHIUM ION SECONDARY BATTERY, ELECTRODE FOR LITHIUM ION SECONDARY BATTERY, AND LITHIUM ION SECONDARY BATTERY

(71) Applicant: SUMITOMO OSAKA CEMENT CO., LTD., Tokyo (JP)

(72) Inventors: Satoru Oshitari, Tokyo (JP); Masataka Oyama, Tokyo (JP); Kouji Oono, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 214 days.

(21) Appl. No.: 16/354,969

(22) Filed: Mar. 15, 2019

(65) Prior Publication Data
US 2020/0106092 A1    Apr. 2, 2020

(30) Foreign Application Priority Data

Sep. 28, 2018  (JP) .............................. JP2018-183719

(51) Int. Cl.
| | |
|---|---|
| *H01M 4/36* | (2006.01) |
| *H01M 4/62* | (2006.01) |
| *H01M 4/58* | (2010.01) |
| *H01M 10/0525* | (2010.01) |

(52) U.S. Cl.
CPC ......... *H01M 4/366* (2013.01); *H01M 4/5825* (2013.01); *H01M 4/625* (2013.01); *H01M 10/0525* (2013.01)

(58) Field of Classification Search
CPC .. H01M 10/0525; H01M 4/136; H01M 4/366; H01M 4/5825; H01M 4/625; Y02E 60/10
See application file for complete search history.

(56) References Cited

U.S. PATENT DOCUMENTS

| | | | |
|---|---|---|---|
| 2007/0054187 A1* | 3/2007 | Nuspl ................ | H01M 4/5825 429/218.1 |
| 2010/0261063 A1* | 10/2010 | Kitagawa .............. | H01M 4/583 429/232 |
| 2012/0301780 A1* | 11/2012 | Kitagawa .............. | H01M 4/625 429/211 |
| 2015/0118558 A1* | 4/2015 | Yamazaki ............. | H01M 4/133 429/220 |
| 2017/0279112 A1* | 9/2017 | Yasumiishi ........... | H01M 4/136 |

FOREIGN PATENT DOCUMENTS

| | | |
|---|---|---|
| JP | 2001-015111 A | 1/2001 |
| JP | 5928648 B | 6/2016 |

* cited by examiner

*Primary Examiner* — Adam A Arciero
(74) *Attorney, Agent, or Firm* — Merchant & Gould P.C.

(57) ABSTRACT

An electrode material for a lithium ion secondary battery of the present invention includes an electrode active material represented by $LiFe_xMn_{1-w-x-y}Mg_yA_wPO_4$ and a carbonaceous film coating a surface of the electrode active material, a particle diameter D10 of secondary particles is 0.5 μm or more, a particle diameter D90 of the secondary particles is 25 μm or less, and a ratio (O/I) of an average value of thicknesses I of the carbonaceous film on the surfaces of the primary particles in a range of 0.3 μm or less from a center of the secondary particle at 300 measurement points to an average value of thicknesses O of the carbonaceous film on the surfaces of the primary particles in a range of 0.3 μm or less from an outermost surface of the secondary particle at 300 measurement points is 0.85 or more and less than 1.00.

20 Claims, No Drawings

ELECTRODE MATERIAL FOR LITHIUM ION SECONDARY BATTERY, ELECTRODE FOR LITHIUM ION SECONDARY BATTERY, AND LITHIUM ION SECONDARY BATTERY

CROSS-REFERENCE TO RELATED APPLICATIONS

This application claims the benefit of Japanese Patent Application No. 2018-183719 filed Sep. 28, 2018, the disclosure of which is herein incorporated by reference in its entirety.

BACKGROUND OF THE INVENTION

Field of the Invention

The present invention relates to an electrode material for a lithium ion secondary battery, an electrode for a lithium ion secondary battery, and a lithium ion secondary battery.

Description of Related Art

Secondary batteries provided with an electrode including $LiFe_xMn_{1-x-y}M_yPO_4$ (hereinafter, also referred to as "LFMP") that is an olivine-based electrode active material have a problem of a significant decrease in the charge and discharge capacity associated with the battery charge and discharge cycle. As one of the causes therefor, the low electron conductivity of electrode active materials made of LFMP (hereinafter, referred to as "LFMP active material") is exemplified. Here, an electrode material having an electron conductivity increased by forming a conductive carbonaceous film on the surface of an electrode active material and interposing carbon in this conductive carbonaceous film as an electron-conducting material between the electrode active materials is known (for example, refer to Japanese Laid-open Patent Publication No. 2001-15111).

In addition, it is known that LFMP active materials have a crystal volume that significantly expands or contract in association with a charge and discharge reaction (for example, refer to Japanese Patent No. 5928648). As a result of the significant expansion or contraction of the crystal volume in association with a charge and discharge reaction, the contact between primary particles deviates, and thus the electron conductivity of LFMP active materials deteriorates. Therefore, LFMP active materials have a problem in that the resistance increases and the charge and discharge capacity decreases.

As one of the solutions to a decrease in the charge and discharge capacity, the support of a large amount of carbon on the surfaces of the primary particles of the LFMP active material is exemplified. However, when a large amount of carbon is present, the LFMP fraction decreases, and the charge and discharge capacity of the electrode active material decreases. In addition, when a carbonaceous film is excessively present on the surfaces of the primary particles of the LFMP active material, the migration of lithium ions is limited. When a large amount of carbon is supported by the surfaces of the primary particles of the LFMP active material, particularly in a low-temperature environment, the reactivity of the LFMP active material degrades, and consequently, the charge and discharge capacity decreases.

SUMMARY OF THE INVENTION

The present invention has been made in consideration of the above-described circumstances, and an object of the present invention is to provide an electrode material for a lithium ion secondary battery capable of holding the contact between primary particles in spite of the significant expansion or contraction of the crystal volume in association with a charge and discharge reaction of an LFMP active material, thereby maintaining electron conductivity and holding the charge and discharge capacity even in a low-temperature environment, an electrode for a lithium ion secondary battery containing the electrode material for a lithium ion secondary battery, and a lithium ion secondary battery including the electrode for a lithium ion secondary battery.

As a result of carrying out intensive studies in order to solve the above-described problem, the present inventors and the like found that, in an electrode material for a lithium ion secondary battery including an electrode active material represented by General Formula $LiFe_xMn_{1-w-x-y}Mg_yA_wPO_4$ (here, A represents at least one selected from the group consisting of Co, Ni, Zn, Al, Ga, Ca, and Ba, $0.00 \leq w \leq 0.02$, $0.05 \leq x \leq 1.00$, and $0.00 \leq y \leq 0.10$) and a carbonaceous film that coats a surface of the electrode active material, when particle diameters of secondary particles formed by agglomerating primary particles are controlled, and a thickness of the carbonaceous film present on surfaces of the primary particles present in the vicinity of a center of the secondary particle is set to be thicker than a thickness of the carbonaceous film present on the surfaces of the primary particles present in the vicinity of a surface of the secondary particle, it is possible to hold the contact between the primary particles even when a charge and discharge reaction is repeated, and it is possible to suppress a decrease in the charge and discharge capacity in association with an increase in a cycle and hold the charge and discharge capacity even in a low-temperature environment and completed the present invention.

An electrode material for a lithium ion secondary battery of the present invention includes an electrode active material represented by General Formula $LiFe_xMn_{1-w-x-y}Mg_yA_wPO_4$ (here, A represents at least one selected from the group consisting of Co, Ni, Zn, Al, Ga, Ca, and Ba, $0.00 \leq w \leq 0.02$, $0.05 \leq x \leq 1.00$, and $0.00 \leq y \leq 0.10$) and a carbonaceous film that coats a surface of the electrode active material, in which a particle diameter D10 at a cumulative volume percentage of 10% by volume in a volume particle size distribution of secondary particles formed by agglomerating primary particles is 0.5 μm or more, a particle diameter D90 at a cumulative volume percentage of 90% by volume in the volume particle size distribution of the secondary particles formed by agglomerating the primary particles is 25 μm or less, and, regarding the carbonaceous film present on surfaces of the primary particles, a ratio (O/I) of an average value of thicknesses I of the carbonaceous film on the surfaces of the primary particles present in a range of 0.3 μm or less from a center of the secondary particle at 300 measurement points to an average value of thicknesses O of the carbonaceous film on the surfaces of the primary particles present in a range of 0.3 μm or less from an outermost surface of the secondary particle at 300 measurement points is 0.85 or more and less than 1.00.

An electrode for a lithium ion secondary battery of the present invention includes an electrode current collector and an electrode mixture layer formed on the electrode current collector, in which the electrode mixture layer contains the electrode material for a lithium ion secondary battery of the present invention.

A lithium ion secondary battery of the present invention includes the electrode for a lithium ion secondary battery of the present invention.

According to the electrode material for a lithium ion secondary battery of the present invention, it is possible to hold the contact between the primary particles and maintain the electron conductivity in spite of a large change in the crystal volume in association with the charge and discharge reaction of the LFMP active material. Therefore, the electrode material for a lithium ion secondary battery of the present invention is excellent in terms of cycle characteristics and the maintenance of a low-temperature capacity.

According to the electrode for a lithium ion secondary battery of the present invention, the electrode material for a lithium ion secondary battery of the present invention is included, and thus it is possible to provide an electrode for a lithium ion secondary battery having excellent cycle characteristics.

According to the lithium ion secondary battery of the present invention, the electrode for a lithium ion secondary battery of the present invention is included, and thus it is possible to provide a lithium ion secondary battery having excellent cycle characteristics.

DETAILED DESCRIPTION OF THE INVENTION

Embodiments of an electrode material for a lithium ion secondary battery, an electrode for a lithium ion secondary battery, and a lithium ion secondary battery of the present invention will be described.

Meanwhile, the present embodiment is a specific description for easier understanding of the gist of the present invention and, unless particularly otherwise described, does not limit the present invention.

Electrode Material for Lithium Ion Secondary Battery

An electrode material for a lithium ion secondary battery of the present embodiment is an electrode material for a lithium ion secondary battery including electrode active material represented by General Formula $LiFe_xMn_{1-w-x-y}Mg_yA_wPO_4$ (here, A represents at least one selected from the group consisting of Co, Ni, Zn, Al, Ga, Ca, and Ba, $0.00 \leq w \leq 0.02$, $0.05 \leq x \leq 1.00$, and $0.00 \leq y \leq 0.10$) and a carbonaceous film that coats a surface of the electrode active material, in which a particle diameter D10 at a cumulative volume percentage of 10% by volume in a volume particle size distribution of secondary particles formed by agglomerating primary particles is 0.5 μm or more, a particle diameter D90 at a cumulative volume percentage of 90% by volume in the volume particle size distribution of the secondary particles formed by agglomerating the primary particles is 25 μm or less, and, regarding the carbonaceous film present on surfaces of the primary particles, a ratio (O/I) of an average value of thicknesses I of the carbonaceous film on the surfaces of the primary particles present in a range of 0.3 μm or less from a center of the secondary particle at 300 measurement points to an average value of thicknesses O of the carbonaceous film on the surfaces of the primary particles present in a range of 0.3 μm or less from an outermost surface of the secondary particle at 300 measurement points is 0.85 or more and less than 1.00.

The electrode material for a lithium ion secondary battery of the present embodiment is mainly used as cathode materials for lithium ion secondary batteries.

The electrode material for a lithium ion secondary battery of the present embodiment includes an electrode active material (primary particles) represented by $LiFe_xMn_{1-w-x-y}Mg_yA_wPO_4$ and a granulated body (secondary particles) formed by granulating primary particles including a carbonaceous film that coats a surface of the electrode active material. Hereinafter, the electrode active material (primary particles) represented by $LiFe_xMn_{1-w-x-y}Mg_yA_wPO_4$ and the primary particles including the carbonaceous film that coats a surface of the electrode active material will also be referred to as the primary particles of the carbonaceous-coated electrode active material in some cases.

In the electrode material for a lithium ion secondary battery of the present embodiment, the particle diameter D10 at a cumulative volume percentage of 10% by volume in the volume particle size distribution of the secondary particles formed by agglomerating the primary particles of the carbonaceous-coated electrode active material is 0.5 μm or more, preferably 0.7 μm or more, and more preferably 1.0 μm or more.

The upper limit value of the particle diameter D10 can be arbitrarily selected. The upper limit value of the particle diameter D10 may be 8.0 μm or less, may be 7.0 μm or less, or may be 6.0 μm or less.

When the particle diameter D10 of the secondary particles is less than 0.5 μm, the number of the secondary particles per volume excessively increases, the amount of a conductive auxiliary agent and a binder resin (binder) blended to prepare an electrode material paste for a lithium ion secondary battery by mixing the electrode material, the conductive auxiliary agent, the binder, and a solvent increases, and the battery capacity of a lithium ion secondary battery per unit mass of an electrode mixture layer for a lithium ion secondary battery decreases, which is not preferable.

In the electrode material for a lithium ion secondary battery of the present embodiment, the particle diameter D90 at a cumulative volume percentage of 90% by volume in the volume particle size distribution of the secondary particles formed by agglomerating the primary particles of the carbonaceous-coated electrode active material is 25 μm or less, preferably 22 μm or less, and more preferably 20 μm or less.

The lower limit of the particle diameter D90 can be arbitrarily selected. The lower limit value of the particle diameter D90 may be 5 μm or more, may be 7 μm or more, or may be 8 μm or more.

When the particle diameter D90 of the secondary particles exceeds 25 μm, in an electrode having a thin thickness of several tens of micrometers which is an ordinary thickness of an in-vehicle lithium ion secondary battery, protrusions and recesses derived from coarse secondary particles on the electrode surface are generated, the reaction distribution in the electrode becomes uneven due to the current concentration on the protrusion portions, and the charge and discharge performance degrades, which is not preferable.

The volume particle size distribution of the secondary particles is measured using a method according to JIS Z8825 "Particle size analysis-Laser diffraction methods".

In the electrode material for a lithium ion secondary battery of the present embodiment, regarding the carbonaceous film present on the surfaces of the primary particles of the carbonaceous-coated electrode active material, the ratio (W/I) of the average value of the thicknesses I of the carbonaceous film on the surfaces of the primary particles of the carbonaceous-coated electrode active material present in a range of 0.3 μm or less from the center of the secondary particle at 300 measurement points to the average value of the thicknesses O of the carbonaceous film on the surfaces of the primary particles present in a range of 0.3 μm or less from the outermost surface of the secondary particle at 300 measurement points is 0.85 or more and less than 1.00, preferably 0.86 or more and less than 1.00, and more preferably 0.87 or more and less than 1.00.

When O/I is less than 0.85, the carbon thickness on the outermost surface of the secondary particle becomes too thin, and the electron conductivity between the secondary particles or between the secondary particle and the conductive auxiliary agent becomes insufficient, and thus the battery characteristics degrade. On the other hand, when O/I exceeds 1.00, the carbon thickness on the outermost surface of the secondary particle becomes too thick, the migration of an electrolytic solution to the inside of the secondary particle from the outside is impaired, and consequently, the migration of Li ions is impaired, and thus the battery characteristics degrade.

The thickness O of the carbonaceous film and the thickness I of the carbonaceous film are measured using a transmission electron microscope (TEM), an energy dispersive X-ray microanalyzer (EDX), or the like.

The thickness O of the carbonaceous film is measured, for example, as described below. Three hundred places on the surfaces of the primary particles present on the surface of the secondary particle of the electrode material for a lithium ion secondary battery are observed using a field-emission transmission electron microscope, and the average value of the thicknesses O of the carbonaceous film at 300 measurement points on the surfaces of the primary particles present in a range of 0.3 μm or less from the outermost surface of the secondary particle is obtained.

In addition, the thickness I of the carbonaceous film is measured, for example, as described below. The powder of the electrode material for a lithium ion secondary battery is worked to a thin film using a focused ion beam working-low-acceleration scanning electron microscope observation device, 300 places on the surfaces of the primary particles present in the vicinity of the center of the secondary particle are observed using a field-emission transmission electron microscope, and the average value of the thicknesses I of the carbonaceous film at 300 measurement points on the surfaces of the primary particles present in a range of 0.3 μm or less from the center of the secondary particle is obtained.

From the average value of the thicknesses O of the carbonaceous film and the average value of the thicknesses I of the carbonaceous film, the ratio (O/I) between the average values of the thicknesses of the carbonaceous film is obtained.

In the electrode material for a lithium ion secondary battery of the present embodiment, the thickness of the carbonaceous film in the primary particles of the carbonaceous-coated electrode active material is preferably 0.7 nm or more and 5.0 nm or less, more preferably 0.8 nm or more and 4.5 nm or less, and still more preferably 1.0 nm or more and 4.0 nm or less.

When the thickness of the carbonaceous film in the primary particles of the carbonaceous-coated electrode active material is 0.7 nm or more, the thickness of the carbonaceous film is too thin, and thus it is possible to suppress the incapability of forming a carbonaceous film having a desired resistance value. On the other hand, when the thickness of the carbonaceous film in the primary particles of the carbonaceous-coated electrode active material is 5.0 nm or less, it is possible to suppress a decrease in the battery capacity per unit mass of the electrode material.

In the electrode material for a lithium ion secondary battery of the present embodiment, the crystallite diameter of the carbonaceous-coated electrode active material is preferably 40 nm or more and 150 nm or less, more preferably 43 nm or more and 130 nm or less, and still more preferably 45 nm or more and 120 nm or less.

When the crystallite diameter of the primary particle of the carbonaceous-coated electrode active material is 40 nm or more, it is possible to suppress the amount of carbon for sufficiently coating the surface of the electrode active material with the carbonaceous film, and it is possible to suppress the necessary amount of the binder, and thus it is possible to increase the amount of the electrode active material in the electrode and increase the capacity of the battery. On the other hand, when the crystallite diameter of the carbonaceous-coated electrode active material is 150 nm or less, it is possible to suppress an increase in the lithium ion diffusion resistance or the electron migration resistance in the primary particles of the electrode active material.

The crystallite diameter of the carbonaceous-coated electrode active material is computed from the Scherrer's equation using the full width at half maximum and the diffraction angle (2θ) of a diffraction peak on a (020) plane in a powder X-ray diffraction pattern obtained by X-ray diffraction measurement.

In the electrode material for a lithium ion secondary battery of the present embodiment, the average particle diameter of the primary particles of the carbonaceous-coated electrode active material is preferably 10 nm or more and 500 nm or less, more preferably 20 nm or more and 400 nm or less, and still more preferably 20 nm or more and 300 nm or less.

When the average particle diameter of the primary particles of the carbonaceous-coated electrode active material is 10 nm or more, it is possible to suppress an increase in the amount of carbon attributed to an excessive increase in the specific surface area. On the other hand, when the average particle diameter of the primary particles of the carbonaceous-coated electrode active material is 500 nm or less, it is possible to improve the electron conductivity and the ion diffusivity due to the size of the specific surface area.

The average particle diameter of the primary particles of the carbonaceous-coated electrode active material is obtained by number-averaging the particle diameters of 200 or more primary particles randomly measured by scanning electron microscopic (SEM) observation.

The shape of the primary particle of a carbonaceous-coated electrode active material is not particularly limited, but is preferably a spherical shape since it is easy to generate an electrode material made of spherical, particularly, truly spherical particles.

Here, the reason for the shape being preferably a spherical shape is as described below. It is possible to decrease the amount of the solvent when the electrode material paste for a lithium ion secondary battery is prepared by mixing the primary particles of the electrode active material coated with the carbonaceous film, the binder, and the solvent. Furthermore, the application of the electrode material paste for a lithium ion secondary battery to the electrode current collector also becomes easy. In addition, when the shape is a spherical shape, the surface area of the primary particles of the electrode active material is minimized, furthermore, it is possible to minimize the mixing amount of the binder being added, and it is possible to decrease the internal resistance of an electrode to be obtained.

Furthermore, when the shape of the primary particle of the electrode active material is set to a spherical shape, particularly, a truly spherical shape, it becomes easy to closely pack the primary particles. Therefore, the amount of the electrode material for a lithium ion secondary battery packed per unit volume increases, consequently, it is possible to increase the electrode density, and it is possible to increase the capacity of the lithium ion secondary battery, which is preferable.

In the electrode material for a lithium ion secondary battery of the present embodiment, the average particle diameter of the granulated body (secondary particles) formed by granulating the primary particles of the carbonaceous-coated electrode active material is preferably 2.0 μm or more and 10 μm or less, more preferably 2.5 μm or more and 9 μm or less, and still more preferably 3.0 μm or more and 8 μm or less.

When the average particle diameter of the secondary particles is 2.0 μm or more, it is possible to suppress the amount of the conductive auxiliary agent and the binder blended to prepare the electrode material paste fora lithium ion secondary battery by mixing the electrode material, the conductive auxiliary agent, the binder resin (binder), and the solvent, and it is possible to increase the battery capacity of the lithium ion secondary battery per unit mass of the electrode mixture layer for a lithium ion secondary battery. On the other hand, when the average particle diameter of the secondary particles is 10 μm or less, it is possible to enhance the dispersibility and uniformity of the conductive auxiliary agent or the binder included in the electrode mixture layer for a lithium ion secondary battery. As a result, it is possible to increase the discharge capacity in high-speed charge and discharge of a lithium ion secondary battery for which the electrode material for a lithium ion secondary battery of the present embodiment is used.

The average particle diameter of the secondary particles is measured using a laser diffraction-type particle size analyzer by suspending the electrode material for a lithium ion secondary battery of the present embodiment in a dispersion medium obtained by dissolving 0.1% by mass of polyvinyl pyrrolidone in water.

In the electrode material for a lithium ion secondary battery of the present embodiment, the content (amount) of carbon per specific surface area is preferably 0.4 mg/m$^2$ or more and 1.8 mg/m$^2$ or less, more preferably 0.5 mg/m$^2$ or more and 1.8 mg/m$^2$ or less, and still more preferably 0.6 mg/m$^2$ or more and 1.5 mg/m$^2$ or less.

When the content of carbon per specific surface area of the electrode material for a lithium ion secondary battery is 0.4 mg/m$^2$ or more, it is possible to sufficiently increase the electron conductivity. On the other hand, when the content of carbon per specific surface area of the electrode material for a lithium ion secondary battery is 1.8 mg/m$^2$ or less, it is possible to increase the electrode density.

The content of carbon in the electrode material for a lithium ion secondary battery of the present embodiment is measured using a carbon analyzer (carbon and sulfur analyzer: EMIA-810W (trade name), manufactured by Horiba Ltd.). The content of carbon per specific surface area can be obtained by dividing the measured content of carbon by a value obtained as the specific surface area measured as described below.

The specific surface area of the electrode material for a lithium ion secondary battery of the present embodiment is preferably 7 m$^2$/g or more and 35 m$^2$/g or less and more preferably 10 m$^2$/g or more and 32 m$^2$/g or less.

When the specific surface area of the electrode material fora lithium ion secondary battery is 7 m$^2$/g or more, it is possible to increase the diffusion rate of lithium ions in the electrode material, and it is possible to improve the battery characteristics of the lithium ion secondary battery. On the other hand, when the specific surface area is 35 m$^2$/g or less, it is possible to increase the electron conductivity.

The specific surface area of the electrode material for a lithium ion secondary battery of the present embodiment is measured using a specific surface area meter and a BET method by means of nitrogen ($N_2$) adsorption.

In the electrode material for a lithium ion secondary battery of the present embodiment, the coating ratio of the carbonaceous film to the primary particles of the carbonaceous-coated electrode active material is preferably 70% or more, more preferably 75% or more, and still more preferably 80% or more.

When the coating ratio of the carbonaceous film to the primary particles of the carbonaceous-coated electrode active material is 70% or more, the coating effect of the carbonaceous film is sufficiently obtained.

The coating ratio of the carbonaceous film to the primary particles of the carbonaceous-coated electrode active material is measured using a transmission electron microscope (TEM), an energy dispersive X-ray microanalyzer (EDX), or the like.

Electrode Active Material

The electrode active material is made of a compound represented by General Formula $LiFe_xMn_{1-w-x-y}Mg_yA_wPO_4$ (here, A represents at least one selected from the group consisting of Co, Ni, Zn, Al, Ga, Ca, and Ba, $0.00 \le w \le 0.02$, $0.05 \le x \le 1.00$, and $0.00 \le y \le 0.10$) which has a crystal structure preferable for Li diffusion.

The reason for setting w to satisfy $0.00 \le w \le 0.02$ in $LiFe_xMn_{1-w-x-y}Mg_yA_wPO_4$ is as described below. Co or Zn is an electrochemically inert element in a voltage range of 1.0 V to 4.3 V and has a strong effect of improving electron conductivity, Li diffusivity, and the activation energy of the insertion and desorption reaction of lithium ions ($Li^+$). However, when a large amount of Co or Zn forms a solid solution, the charge and discharge capacity and the energy density decrease significantly, and thus a relatively small amount of Co or Zn is allowed to form a solid solution so that the battery characteristics such as high-rate characteristics or low-temperature characteristics or the like can be sufficiently improved while preventing an excessive decrease in the energy density.

The reason for setting x to satisfy $0.05 \le x \le 1.00$ in $LiFe_xMn_{1-w-x-y}Mg_yA_wPO_4$ is as described below. Fe is a carbonization catalyst element, and the containment of Fe improves the coatability of the carbonaceous film and is thus capable of improving the battery characteristics such as high-rate characteristics, low-temperature characteristics, or the like. Therefore, the range of x is set to a content at which a sufficient carbonization catalytic action can be developed.

The reason for setting y to satisfy $0.00 \le y \le 0.10$ in $LiFe_xMn_{1-w-x-y}Mg_yA_wPO_4$ is as described below. Mg is an electrochemically inert element and has a strong effect of improving electron conductivity, Li diffusivity, and the activation energy of the insertion and desorption reaction of lithium ions ($Li^+$). However, when a large amount of Mg forms a solid solution, the charge and discharge capacity and the energy density decrease significantly, and thus a relatively small amount of Mg is allowed to form a solid solution so that the battery characteristics such as high-rate characteristics, low-temperature characteristics, or the like can be sufficiently improved while preventing an excessive decrease in the energy density.

In $LiFe_xMn_{1-w-x-y}Mg_yA_wPO_4$, A is an electrochemically inert element in a voltage range of 1.0 V to 4.3 V. Being electrochemically inert in a voltage range of 1.0 V to 4.3 V specifically means that, even in a case in which the lithium ion secondary battery is constituted, and the voltage is changed in a range of 1.0 V to 4.3V, the acid value of the element remains unchanged as being divalent, and an element not contributing to the development of the charge and discharge capacity is preferred.

As the above-described A, at least one selected from the group consisting of Co, Ni, Zn, Al, Ga, Ca, and Ba is exemplified. That is, as A, one element may be singly used or two or more elements may be combined (mixed) together and used.

In $LiFe_xMn_{1-w-x-y}Mg_yA_wPO_4$ in the present embodiment, A is preferably Co and more preferably a mixture of Co and Zn. In a case in which A is a mixture of Co, the w preferably satisfies $0.00 \leq w \leq 0.02$ and more preferably satisfies $0.003 \leq w \leq 0.015$.

Carbonaceous Film

The carbonaceous film is a pyrolytic carbonaceous film obtained by carbonizing an organic compound that serves as a raw material. A source of carbon that serves as a raw material of the carbonaceous film is preferably derived from an organic compound having a purity of carbon of 42.00% or more and 60.00% or less.

As a method for calculating "the purity of carbon" of the source of carbon that serves as a raw material of the carbonaceous film in the cathode material for a lithium ion secondary battery of the present embodiment, in a case of a plurality of kinds of organic compounds is used, a method in which amounts (% by mass) of carbon in amounts of the respective organic compounds blended are calculated and summed from the amounts (% by mass) of the respective organic compounds blended and a well-known purity (%) of carbon and the purity of carbon is calculated according to Expression (1) using a total amount (% by mass) of the organic compounds blended and a total amount (% by mass) of carbon is used.

Purity (%) of carbon=total amount (% by mass) of carbon/total amount blended (% by mass)×100    (1)

According to the electrode material for a lithium ion secondary battery of the present embodiment, in spite of a large change in the crystal volume in association with the charge and discharge reaction of the LFMP active material, it is possible to hold the contact between the primary particles and maintain the electron conductivity. Therefore, the electrode material for a lithium ion secondary battery of the present embodiment is excellent in terms of the cycle characteristics and the maintenance of the low-temperature capacity.

Method for Manufacturing Electrode Material for Lithium Ion Secondary Battery

A method for manufacturing the electrode material for a lithium ion secondary battery of the present embodiment is not particularly limited. Examples thereof include a method having a step of synthesizing $LiFe_xMn_{1-w-x-y}Mg_yA_wPO_4$ particle under pressurization by heating a raw material slurry α obtained by mixing a Li source, a Fe source, a Mn source, a Mg source, a P source, and an A source with a solvent containing water as a main component to a temperature in a range of 125° C. or higher and 300° C. or lower and a step of coating the surface of the $LiFe_xMn_{1-w-x-y}Mg_yA_wPO_4$ particles (primary particles) with a carbonaceous film by drying and granulating a raw material slurry β formed by dispersing the $LiFe_xMn_{1-w-x-y}Mg_yA_wPO_4$ particles in a water solvent including a carbon source and then heating the granulated body to a temperature in a range of 450° C. or higher and 850° C. or lower.

A method for synthesizing the $LiFe_xMn_{1-w-x-y}Mg_yA_wPO_4$ particles is not particularly limited; however, for example, the Li source, the Fe source, the Mn source, the Mg source, the P source, and the A (at least one selected from the group consisting of Co, Ni, Zn, Al, Ga, Ca, and Ba) source are injected into a solvent containing water as a main component and stirred, thereby preparing the raw material slurry a including a precursor of $LiFe_xMn_{1-w-x-y}Mg_yA_wPO_4$.

The Li source, the Fe source, the Mn source, the Mg source, the P source, and the A source are injected into the solvent containing water as a main component so that the molar ratio thereof (Li source:Fe source:Mn source:Mg source:P source:A source), that is, the molar ratio of Li:Fe:Mn:Mg:P:A reaches 2.5 to 3.5:0.05 to 1.0:0 to 0.95:0 to 0.10:0 to 0.02:0.95 to 1.08 and stirred and mixed together, thereby preparing the raw material slurry α.

When the uniform mixing of the Li source, the Fe source, the Mn source, the Mg source, the P source, and the A source is taken into account, it is preferable to, first, put the Li source, the Fe source, the Mn source, the Mg source, the P source, and the A source into an aqueous solution state respectively and mix the aqueous solutions.

The molar concentrations of the Li source, the Fe source, the Mn source, the Mg source, the P source, and the A source in this raw material slurry α are preferably 0.8 mol/L or more and 3.0 mol/L or less since it is necessary to obtain $LiFe_xMn_{1-w-x-y}Mg_yA_wPO_4$ particles which are highly pure, highly crystalline, and extremely fine.

Examples of the Li source include hydroxides such as lithium hydroxide (LiOH) and the like, inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), lithium dihydrogen phosphate ($LiH_2PO_4$), and the like, organic lithium acid salts such as lithium acetate ($LiCH_3COO$), lithiumoxalate ($(COOLi)_2$), and the like, and hydrates thereof. As the Li source, at least one selected from the above-described group is preferably used.

Meanwhile, lithium phosphate ($Li_3PO_4$) can also be used as the Li source and the P source.

As the Fe source, for example, an iron compound such as iron (II) chloride ($FeCl_2$), iron (II) sulfate ($FeSO_4$), iron (III) acetate ($Fe(CH_3COO)_2$), or the like or a hydrate thereof, a trivalent iron compound such as iron (III) nitrate ($Fe(NO_3)_3$), iron (III) chloride ($FeCl_3$), iron (II) citrate ($FeC_6H_5O_7$), or the like, lithium iron phosphate, or the like can be used.

As the Mn source, a Mn salt is preferred, and examples thereof include manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof. As the Mn source, at least one selected from the above-described group is preferably used.

As the Mg source, a Mg salt is preferred, and examples thereof include magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof. As the Mg source, at least at least one selected from the above-described group is preferably used.

As the P source, for example, at least one compound selected from phosphoric acids such as orthophosphoric acid ($H_3PO_4$) metaphosphoric acid ($HPO_3$), and the like, phosphoric salts such as ammonium dihydrogen phosphate ($NH_4H_2PO_4$), diammonium hydrogen phosphate (($NH_4)_2HPO_4$), ammonium hydrogen phosphate (($NH_4)_3PO_4$) lithium phosphate ($Li_3PO_4$), lithium hydrogen phosphate ($Li_2HPO_4$), lithium dihydrogen phosphate ($LiH_2PO_4$), and the like, and hydrates thereof is preferably used.

As the A source, at least one selected from the group consisting of a Co source made of a cobalt compound, a Ni source made of a nickel compound, a Zn source made of a zinc compound, an Al source made of an aluminum compound, a Ga source made of a gallium compound, a Ca source made of a calcium compound, and a Ba source made of a barium compound is used.

As the Co source, a Co salt is preferred, and examples thereof include cobalt (II) chloride ($CoCl_2$), cobalt (II) sulfate ($CoSO_4$) cobalt (II) nitrate ($Co(NO_3)_2$), cobalt (II) acetate ($Co(CH_3COO)_2$) and hydrates thereof. As the Co source, at least one selected from the above-described group is preferably used.

As the Ni source, a Ni salt is preferred, and examples thereof include nickel (II) chloride ($NiCl_2$), nickel (II) sulfate ($NiSO_4$), nickel (II) nitrate ($Ni(NO_3)_2$), nickel (II) acetate ($Ni(CH_3COO)_2$) and hydrates thereof. As the Ni source, at least one selected from the above-described group is preferably used.

As the Zn source, a Zn salt is preferred, and examples thereof include zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof. As the Zn source, at least one selected from the above-described group is preferably used.

Examples of the Al source include aluminum compounds such as a chloride, a sulfate, a nitrate, an acetate, a hydroxide, and the like, and at least one selected from the group consisting of the above-described compounds is preferably used.

Examples of the Ga source include gallium compounds such as a chloride, a sulfate, a nitrate, an acetate, a hydroxide, and the like, and at least one selected from the group consisting of the above-described compounds is preferably used.

As the Ca source, a Ca salt is preferred, and examples thereof include calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof. As the Ca source, at least one selected from the group consisting of the above-described compounds is preferably used.

As the Ba source, a Ba salt is preferred, and examples thereof include barium (II) chloride ($BaCl_2$), barium(II) sulfate ($BaSO_4$), barium (II) nitrate ($Ba(NO_3)_2$),barium (II) acetate ($Ba(CH_3COO)_2$), and hydrates thereof. As the Ba source, at least one selected from the group consisting of the above-described compounds is preferably used.

The solvent including water as a main component is any one of water alone and water-based solvents which include water as a main component and include an aqueous solvent such as an alcohol or the like as necessary.

The aqueous solvent is not particularly limited as long as the solvent is capable of dissolving the Li source, the Fe source, the Mn source, the Mg source, the P source, and the A source. Examples thereof include alcohols such as methanol, ethanol, 1-propanol, 2-propanol (isopropyl alcohol: IPA), butanol, pentanol, hexanol, octanol, diacetone alcohol, and the like, esters such as ethyl acetate, butyl acetate, ethyl lactate, propylene glycol monomethyl ether acetate, propylene glycol monoethyl ether acetate, γ-butyrolactone, and the like, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like, ketones such as acetone, methyl ethyl ketone (MEK), methyl isobutyl ketone (MIBK), acetyl acetone, cyclohexanone, and the like, amides such as dimethyl formamide, N,N-dimethylacetoacetamide, N-methylpyrrolidone, and the like, glycols such as ethylene glycol, diethylene glycol, propylene glycol, and the like, and the like. These aqueous solvents may be used singly or a mixture of two or more aqueous solvents may be used.

Next, this raw material slurry a is put into a pressure resistant vessel, is heated to a temperature in a range of 125° C. or higher and 300° C. or lower and preferably in a range of 130° C. or higher and 220° C. or lower, and is hydrothermally treated for one hour to 72 hours, thereby obtaining $LiFe_xMn_{1-w-x-y}Mg_yA_wPO_4$ particles.

The pressure in the pressure resistant vessel reaches, for example, 0.1 MPa or more and 2 MPa or less when the raw material slurry reaches the temperature in a range of 125° C. or higher and 300° C. or lower.

In this case, it is possible to control the particle diameter of the $LiFe_xMn_{1-w-x-y}Mg_yA_wPO_4$ particles to a desired size by adjusting the temperature and time during the hydrothermal treatment.

Next, the $LiFe_xMn_{1-w-x-y}Mg_yA_wPO_4$ particles are dispersed in the water solvent including the carbon source, thereby preparing the raw material slurry β.

Next, this raw material slurry β is dried so as to be granulated, and is then heated at a temperature in a range of 450° C. or higher and 850° C. or lower for one hour or longer and 36 hours or shorter, and the surfaces of the $LiFe_xMn_{1-w-x-y}Mg_yA_wPO_4$ particles (primary particles) are coated with the carbonaceous film, thereby obtaining the electrode material for a lithium ion secondary battery of the present embodiment.

Carbon Source

The carbon source is not particularly limited as long as the carbon source is an organic compound capable of forming a carbonaceous film on the surface of the cathode active material.

The organic compound is preferably a compound that is soluble in water or dispersible in water.

Examples thereof include salicylic acid, catechol, hydroquinone, resorcinol, pyrogallol, phloroglucinol, hexahydroxybenzene, benzoic acid, phthalic acid, terephthalic acid, phenylalanine, water dispersible phenolic resins and the like, sugars such as sucrose, glucose, lactose, maltodextrin, and the like, carboxylic acids such as malic acid, citric acid, and the like, unsaturated monohydric alcohols such as allyl alcohol, propargyl alcohol, and the like, ascorbic acid, polyvinyl alcohol, and the like, and it is possible to use one organic compound or a mixture of two or more organic compounds with a purity of carbon set to 42.00% or more.

In the method for manufacturing an electrode material for a lithium ion secondary battery of the present embodiment, when the total mass of the electrode active material and the carbon source is set to 100% by mass, the amount of the carbon source added (additive rate) is preferably 0.5% by mass or more and 15% by mass or less and more preferably 1% by mass or more and 10% by mass or less.

When the amount of the carbon source added is less than 0.5% by mass, mixing stability in the electrode material for a lithium ion secondary battery degrades, which is not preferable. On the other hand, when the amount of the carbon source added exceeds 15% by mass, the content of an electrode active material becomes relatively small, and battery characteristics degrade, which is not preferable.

In addition, in a case in which a plurality of kinds of organic compounds is used as the carbon source, amounts of the respective organic compounds blended are adjusted as described above so that the purity of carbon of the organic compounds reaches 42.00% or more and 60.00% or less.

Electrode for Lithium Ion Secondary Battery

An electrode for a lithium ion secondary battery of the present embodiment includes an electrode current collector and an electrode mixture layer (electrode) formed on the electrode current collector, and the electrode mixture layer includes the electrode material for a lithium ion secondary battery of the present embodiment.

That is, the electrode for a lithium ion secondary battery of the present embodiment is obtained by forming an electrode mixture layer on one main surface of an electrode current collector using the electrode material for a lithium ion secondary battery of the present embodiment.

A method for manufacturing the electrode for a lithium ion secondary battery of the present embodiment is not particularly limited as long as the electrode can be formed on one main surface of an electrode current collector using the electrode material for a lithium ion secondary battery of the present embodiment.

Examples of the method for manufacturing the electrode for a lithium ion secondary battery of the present embodiment include the following method.

First, the electrode material paste for a lithium ion secondary battery is prepared by mixing the electrode material for a lithium ion secondary battery of the present embodiment, a binder, a conductive auxiliary agent, and a solvent.

Binder

The binder is not particularly limited as long as the binder can be used in a water system. Examples thereof include at least one binder selected from the group of polyethylene, polypropylene, polyethylene terephthalate, polymethyl methacrylate, vinyl acetate copolymers, styrene/butadiene-based latexes, acrylic latexes, acrylonitrile/butadiene-based latexes, fluorine-based latexes, silicon-based latexes, and the like.

When the total mass of the electrode material for a lithium ion secondary battery of the present embodiment, the binder, and the conductive auxiliary agent is set to 100% by mass, the content rate of the binder in the electrode material paste for a lithium ion secondary battery is preferably 1% by mass or more and 10% by mass or less and more preferably 2% by mass or more and 6% by mass or less.

Conductive Auxiliary Agent

The conductive auxiliary agent is not particularly limited, and, for example, at least one element selected from the group of fibrous carbon such as acetylene black, KETJEN BLACK, furnace black, vapor-grown carbon fiber (VGCF), carbon nanotube, and the like is used.

When the total mass of the electrode material for a lithium ion secondary battery of the present embodiment, the binder, and the conductive auxiliary agent is set to 100% by mass, the content rate of the conductive auxiliary agent in the electrode material paste for a lithium ion secondary battery is preferably 1% by mass or more and 15% by mass or less and more preferably 3% by mass or more and 10% by mass or less.

Solvent

To the electrode material paste for a lithium ion secondary battery including the electrode material for a lithium ion secondary battery of the present embodiment, a solvent is appropriately added in order to facilitate coating of an article to be coated such as an electrode current collector or the like.

A principal solvent is water, but water-based solvents such as alcohols, glycols, ethers, and the like may be added thereto as long as the characteristics of the electrode material for a lithium ion secondary battery of the present embodiment are not lost.

The content rate of the solvent in the electrode material paste for a lithium ion secondary battery is preferably 60 parts by mass or more and 400 parts by mass or less and more preferably 80 parts by mass or more and 300 parts by mass or less in a case in which the total mass of the electrode material for a lithium ion secondary battery of the present embodiment, the binder, and the solvent is set to 100 parts by mass.

When the solvent is included in the above-described range, it is possible to obtain an electrode material paste for a lithium ion secondary battery having excellent electrode formability and excellent battery characteristics.

A method for mixing the electrode material for a lithium ion secondary battery of the present embodiment, the binder, the conductive auxiliary agent, and the solvent is not particularly limited as long as it is possible to uniformly mix the above-described components. Examples thereof include methods in which a kneader such as a ball mill, a sand mill, a planetary mixer, a paint shaker, a homogenizer, or the like is used.

Next, the electrode material paste for a lithium ion secondary battery is applied onto one main surface of the electrode current collector so as to form a coated film, this coated film is dried and then pressed, whereby it is possible to obtain an electrode for a lithium ion secondary battery which has the electrode mixture layer formed on one main surface of the electrode current collector.

According to the electrode for a lithium ion secondary battery of the present embodiment, the electrode material for a lithium ion secondary battery of the present embodiment is contained, and thus it is possible to provide an electrode for a lithium ion secondary battery having excellent cycle characteristics.

Lithium Ion Secondary Battery

A lithium ion secondary battery of the present embodiment includes a cathode made of the electrode for a lithium ion secondary battery of the present embodiment, an anode, a separator, and an electrolytic solution.

In the lithium ion secondary battery of the present embodiment, the anode, the electrolytic solution, the separator, and the like are not particularly limited.

As the anode, for example, an anode material such as metallic Li, a carbon material, a Li alloy, $Li_4Ti_5O_{12}$, or the like can be used.

In addition, instead of the electrolytic solution and the separator, a solid electrolyte may also be used.

The electrolytic solution can be produced by, for example, mixing ethylene carbonate (EC) and ethyl methyl carbonate (EMC) so that the volume ratio therebetween reaches 1:1, and dissolving lithium hexafluorophosphate ($LiPF_6$) in the obtained solvent mixture so that the concentration thereof reaches, for example, 1 mol/dm$^3$.

As the separator, it is possible to use, for example, porous propylene.

In the lithium ion secondary battery of the present embodiment, the electrode for a lithium ion secondary battery of the present embodiment is used, and thus the cycle characteristics are excellent.

EXAMPLES

Hereinafter, the present invention will be more specifically described using examples and comparative examples, but the present invention is not limited to the following examples.

Cathode materials of Example 1 to Example 6 and Comparative Example 1 to Comparative Example 5 were produced in the following manner.

Example 1

$Li_3PO_4$ as a Li source and a P source, a $FeSO_4$ aqueous solution as a Fe source, a $MnSO_4$ aqueous solution as a Mn source, a $MgSO_4$ aqueous solution as a Mg source, and a $CoSO_4$ aqueous solution as a Co source were used, and these components were mixed together so that the molar ratios thereof reached Li:Fe:Mn:Mg:Co:P=3.000:0.245:0.700:0.050:0.005:1.000, thereby preparing a raw material slurry (1,000 L).

Next, this raw material slurry was put into a pressure resistant vessel.

After that, a heating reaction of this raw material slurry was caused at 185° C. for 4.5 hours.

After the reaction, the atmosphere in the pressure resistant vessel was cooled to room temperature, thereby obtaining a cake-state precipitate of a reaction product.

This precipitate was sufficiently cleaned with distilled water a plurality of times, thereby producing a cake-form substance.

Next, to this cake-form substance (5 kg in terms of solid content), as organic compounds that served as raw materials of a carbonaceous film, a maltodextrin aqueous solution (1.78 kg) adjusted in advance to a solid content of 20% by mass and pure water were added (the pure water was added so that the total solid content reached 20% by mass), and a dispersion treatment was carried out for two hours using zirconia balls having a diameter of 1 mm as medium particles in a bead mill, thereby preparing a homogeneous slurry.

Next, this slurry was sprayed and dried in the atmosphere at 160° C., thereby obtaining a granulated body of a cathode active material coated with an organic substance.

Maltodextrin powder was added to and mixed with the obtained granulated body so that the content of the maltodextrin powder reached 2.37% by mass with respect to 100% by mass of the granulated body, thereby obtaining a raw material for calcination. At this time, the total amount of maltodextrin being added to the cathode active material was set to 9.50% by mass with respect to 100% by mass of the granulated body.

This raw material for calcination (2.5 kg) was spread on a graphite sheath having a capacity of 10 L and calcined in a non-oxidative gas atmosphere at 730° C. for 1.5 hours. After that, the raw material for calcination was held at 40° C. for 30 minutes, thereby obtaining a calcined substance.

This calcined substance was passed through a sieve having a mesh diameter of 75 μm, thereby obtaining a cathode material for a lithium ion secondary battery of Example 1.

As a method for adding the carbon source, a method in which the carbon source is added to the cake-form substance of the cathode active material as an aqueous solution and a method in which the carbon source is added to the granulated body of the cathode active material obtained by spraying and drying the slurry as powder were jointly used.

In the method in which the carbon source is added to the cake-form substance of the cathode active material as an aqueous solution, it is possible to evenly coat the granulated body of the cathode active material with the organic substance of the carbon source, but the organic substance on the surface preferentially volatilizes by the subsequent calcination step, and the film thickness O on the outermost surface of the granulated body becomes thin.

On the other hand, in the method in which the carbon source is added to the granulated body of the cathode active material as powder, a large amount of the organic substance is present on the surface of the granulated body, and thus it is possible to prevent the thickness O of the carbonaceous film on the outermost surface of the granulated body from becoming thin in the calcination step, but the intrusion of the organic substance into the granulated body of the cathode active material becomes insufficient, and the thickness I of the carbonaceous film on the surfaces of the primary particles present in the granulated body becomes thin. Therefore, the amounts of the aqueous solution and the powder of the carbon source added were adjusted using the above-described two kinds of methods for adding the carbon source, thereby adjusting the O/I ratio of the electrode material.

Production of Lithium Ion Secondary Battery

The cathode material for a lithium ion secondary battery, polyvinylidene fluoride (PVdF) as a binder, and acetylene black (AB) as a conductive auxiliary agent were added to N-methyl-2-pyrrolidone (NMP) which was a solvent so that the mass ratio therebetween (the cathode material for a lithium ion secondary battery:AB:PVdF) in paste reached 90:5:5, and the components were mixed together, thereby preparing cathode material paste for a lithium ion secondary battery.

Next, this cathode material paste for a lithium ion secondary battery was applied to a surface of a 30 μm-thick aluminum foil (electrode current collector) so as to forma coated film, and the coated film was dried, thereby forming a cathode mixture layer on the surface of the aluminum foil. After that, the cathode mixture layer was pressed under a predetermined pressure so as to obtain a predetermined density, thereby producing a cathode for a lithium ion secondary battery of Example 1.

Next, a circular plate having a diameter of 16 mm was produced from the cathode for a lithium ion secondary battery using a shaping machine by means of punching, was dried in a vacuum, and then a lithium ion secondary battery of Example 1 was produced using a stainless steel (SUS) 2016 coil cell in a dried argon atmosphere.

Metallic lithium was used as an anode, a porous polypropylene film was used as a separator, and a $LiPF_6$ solution (1 mol/L) was used as an electrolytic solution. As the $LiPF_6$ solution, a solution obtained by mixing ethylene carbonate and ethyl methyl carbonate so that the volume ratio therebetween reached 1:1 was used.

Example 2

A cathode material for a lithium ion secondary battery of Example 2 was obtained in the same manner as in Example 1 except for the fact that, as organic compounds that served as raw materials of a carbonaceous film, a maltodextrin aqueous solution (1.48 kg) adjusted in advance to a solid content of 20% by mass was added to the cake-form substance (5 kg in terms of solid content), and maltodextrin powder was added to and mixed with the obtained granulated body so that the content of the maltodextrin powder reached 3.56% by mass with respect to 100% by mass of the granulated body, thereby obtaining a raw material for calcination.

At this time, the total amount of maltodextrin being added to the cathode active material was set to 9.50% by mass with respect to 100% by mass of the granulated body.

In addition, a lithium ion secondary battery of Example 2 was produced in the same manner as in Example 1.

Example 3

A cathode material for a lithium ion secondary battery of Example 3 was obtained in the same manner as in Example 1 except for the fact that, as organic compounds that served as raw materials of a carbonaceous film, a maltodextrin aqueous solution (1.19 kg) adjusted in advance to a solid content of 20% by mass was added to the cake-form substance (5 kg in terms of solid content), and maltodextrin powder was added to and mixed with the obtained granulated body so that the content of the maltodextrin powder reached 4.75% by mass with respect to 100% by mass of the granulated body, thereby obtaining a raw material for calcination.

At this time, the total amount of maltodextrin being added to the cathode active material was set to 9.50% by mass with respect to 100% by mass of the granulated body.

In addition, a lithium ion secondary battery of Example 3 was produced in the same manner as in Example 1.

Example 4

A cathode material for a lithium ion secondary battery of Example 4 was obtained in the same manner as in Example 1 except for the fact that, as organic compounds that served as raw materials of a carbonaceous film, a maltodextrin aqueous solution (1.19 kg) adjusted in advance to a solid content of 20% by mass was added to the cake-form substance (5 kg in terms of solid content), and maltodextrin powder was added to and mixed with the obtained granulated body so that the content of the maltodextrin powder reached 4.75% by mass with respect to 100% by mass of the granulated body, thereby obtaining a raw material for calcination.

At this time, the total amount of maltodextrin being added to the cathode active material was set to 9.50% by mass with respect to 100% by mass of the granulated body.

In addition, a lithium ion secondary battery of Example 4 was produced in the same manner as in Example 1.

Comparative Example 1

A cathode material for a lithium ion secondary battery of Comparative Example 1 was obtained in the same manner as in Example 1 except for the fact that, as organic compounds that served as raw materials of a carbonaceous film, a maltodextrin aqueous solution (2.37 kg) adjusted in advance to a solid content of 20% by mass was added to the cake-form substance (5 kg in terms of solid content), and maltodextrin powder was not added to the obtained granulated body, thereby obtaining a raw material for calcination.

At this time, the total amount of maltodextrin being added to the cathode active material was set to 9.50% by mass with respect to 100% by mass of the granulated body.

In addition, a lithium ion secondary battery of Comparative Example 1 was produced in the same manner as in Example 1.

Comparative Example 2

A cathode material for a lithium ion secondary battery of Comparative Example 2 was obtained in the same manner as in Example 1 except for the fact that, as organic compounds that served as raw materials of a carbonaceous film, a maltodextrin aqueous solution (0.59 kg) adjusted in advance to a solid content of 20% by mass was added to the cake-form substance (5 kg in terms of solid content), and maltodextrin powder was added to and mixed with the obtained granulated body so that the content of the maltodextrin powder reached 7.12% by mass with respect to 100% by mass of the granulated body, thereby obtaining a raw material for calcination.

At this time, the total amount of maltodextrin being added to the cathode active material was set to 9.50% by mass with respect to 100% by mass of the granulated body.

In addition, a lithium ion secondary battery of Comparative Example 2 was produced in the same manner as in Example 1.

Comparative Example 3

A cathode material for a lithium ion secondary battery of Comparative Example 3 was obtained in the same manner as in Example 1 except for the fact that, as organic compounds that served as raw materials of a carbonaceous film, a maltodextrin aqueous solution (0.30 kg) adjusted in advance to a solid content of 20% by mass was added to the cake-form substance (5 kg in terms of solid content), and maltodextrin powder was added to and mixed with the obtained granulated body so that the content of the maltodextrin powder reached 8.31% by mass with respect to 100% by mass of the granulated body, thereby obtaining a raw material for calcination.

At this time, the total amount of maltodextrin being added to the cathode active material was set to 9.50% by mass with respect to 100% by mass of the granulated body.

In addition, a lithium ion secondary battery of Comparative Example 3 was produced in the same manner as in Example 1.

Comparative Example 4

To the cake-form substance (5 kg in terms of solid content), as organic compounds that served as raw materials of a carbonaceous film, a maltodextrin aqueous solution (1.19 kg) adjusted in advance to a solid content of 20% by mass was added, then, this raw material was halved, pure water was added to one half so that the solid content reached 5% by mass, and pure water was added to an other half so that the solid content reached 45% by mass.

A dispersion treatment was carried out on the respective raw materials using zirconia balls having a diameter of 1 mm as medium particles in a bead mill for two hours, thereby preparing homogeneous slurries.

Next, these slurries were respectively sprayed and dried in the atmosphere at 160° C., thereby obtaining granulated bodies of cathode active materials coated with an organic substance.

After that, the granulated bodies obtained respectively were mixed together so that the mass ratio reached 1:1, maltodextrin powder was added to and mixed with the mixed granulated body so that the content of the maltodextrin powder reached 4.75% by mass with respect to 100% by mass of the granulated body, thereby obtaining a raw material for calcination. A cathode material for a lithium ion secondary battery of Comparative Example 4 was obtained in the same manner as in Example 1 except for what has been described above.

At this time, the total amount of maltodextrin being added to the cathode active material was set to 9.50% by mass with respect to 100% by mass of the granulated body.

In addition, a lithium ion secondary battery of Comparative Example 4 was produced in the same manner as in Example 1.

Example 5

$Li_3PO_4$ as a Li source and a P source and a $FeSO_4$ aqueous solution as a Fe source were used, and these components were mixed together so that the molar ratios thereof reached Li:Fe:P=3:1:1, thereby preparing a raw material slurry (1,000 L).

Next, this raw material slurry was put into a pressure resistant vessel.

After that, a heating reaction of this raw material slurry was caused at 205° C. for 2.5 hours.

After the reaction, the atmosphere in the pressure resistant vessel was cooled to room temperature, thereby obtaining a cake-state precipitate of a reaction product.

This precipitate was sufficiently cleaned with distilled water a plurality of times, thereby producing a cake-form substance.

Next, to this cake-form substance (5 kg in terms of solid content), as organic compounds that served as raw materials of a carbonaceous film, a maltodextrin aqueous solution (1.19 kg) adjusted in advance to a solid content of 20% by mass and pure water were added (the pure water was added so that the total solid content reached 25% by mass), and a dispersion treatment was carried out for two hours using zirconia balls having a diameter of 1 mm as medium particles in a bead mill, thereby preparing a homogeneous slurry.

Next, this slurry was sprayed and dried in the atmosphere at 160° C., thereby obtaining a granulated body of a cathode active material coated with an organic substance.

Maltodextrin powder was added to and mixed with the obtained granulated body so that the content of the maltodextrin powder reached 2.37% by mass with respect to 100% by mass of the granulated body, thereby obtaining a raw material for calcination. At this time, the total amount of maltodextrin being added to the cathode active material was set to 7.12% by mass with respect to 100% by mass of the granulated body.

This raw material for calcination (2.5 kg) was spread on a graphite sheath having a capacity of 10 L and calcined in a non-oxidative gas atmosphere at 820° C. for 1.5 hours. After that, the raw material for calcination was held at 40° C. for 30 minutes, thereby obtaining a calcined substance.

This calcined substance was passed through a sieve having a mesh diameter of 75 μm, thereby obtaining a cathode material for a lithium ion secondary battery of Example 5.

In addition, a lithium ion secondary battery of Example 5 was produced in the same manner as in Example 1.

Example 6

A cathode material for a lithium ion secondary battery of Example 6 was obtained in the same manner as in Example 5 except for the fact that, as organic compounds that served as raw materials of a carbonaceous film, a maltodextrin aqueous solution (0.89 kg) adjusted in advance to a solid content of 20% by mass was added to the cake-form substance (5 kg in terms of solid content), and maltodextrin powder was added to and mixed with the obtained granulated body so that the content of the maltodextrin powder reached 3.56% by mass with respect to 100% by mass of the granulated body, thereby obtaining a raw material for calcination.

At this time, the total amount of maltodextrin being added to the cathode active material was set to 7.12% by mass with respect to 100% by mass of the granulated body.

In addition, a lithium ion secondary battery of Example 6 was produced in the same manner as in Example 1.

Comparative Example 5

A cathode material for a lithium ion secondary battery of Comparative Example 5 was obtained in the same manner as in Example 5 except for the fact that, as organic compounds that served as raw materials of a carbonaceous film, a maltodextrin aqueous solution (1.78 kg) adjusted in advance to a solid content of 20% by mass was added to the cake-form substance (5 kg in terms of solid content), and maltodextrin powder was not added to the obtained granulated body, thereby obtaining a raw material for calcination.

At this time, the total amount of maltodextrin being added to the cathode active material was set to 7.12% by mass with respect to 100% by mass of the granulated body.

In addition, a lithium ion secondary battery of Comparative Example 5 was produced in the same manner as in Example 1.

Comparative Example 6

A cathode material for a lithium ion secondary battery of Comparative Example 6 was obtained in the same manner as in Example 5 except for the fact that, as organic compounds that served as raw materials of a carbonaceous film, a maltodextrin aqueous solution (0.30 kg) adjusted in advance to a solid content of 20% by mass was added to the cake-form substance (5 kg in terms of solid content), and maltodextrin powder was added to and mixed with the obtained granulated body so that the content of the maltodextrin powder reached 5.94% by mass with respect to 100% by mass of the granulated body, thereby obtaining a raw material for calcination.

At this time, the total amount of maltodextrin being added to the cathode active material was set to 7.12% by mass with respect to 100% by mass of the granulated body.

In addition, a lithium ion secondary battery of Comparative Example 6 was produced in the same manner as in Example 1.

Comparative Example 7

To the cake-form substance (5 kg in terms of solid content), as organic compounds that served as raw materials of a carbonaceous film, a maltodextrin aqueous solution (0.89 kg) adjusted in advance to a solid content of 20% by mass was added, then, this raw material was halved, pure water was added to one half so that the solid content reached 5% by mass, and pure water was added to the other half so that the solid content reached 45% by mass.

A dispersion treatment was carried out on the respective raw materials using zirconia balls having a diameter of 1 mm as medium particles in a bead mill for two hours, thereby preparing homogeneous slurries.

Next, these slurries were respectively sprayed and dried in the atmosphere at 160° C., thereby obtaining granulated bodies of cathode active materials coated with an organic substance. After that, the granulated bodies obtained respectively were mixed together so that the mass ratio reached 1:1, maltodextrin powder was added to and mixed with the mixed granulated body so that the content of the maltodextrin powder reached 3.56% by mass with respect to 100% by mass of the granulated body, thereby obtaining a raw material for calcination. A cathode material for a lithium ion secondary battery of Comparative Example 7 was obtained in the same manner as in Example 5 except for what has been described above.

At this time, the total amount of maltodextrin being added to the cathode active material was set to 7.12% by mass with respect to 100% by mass of the granulated body.

In addition, a lithium ion secondary battery of Comparative Example 7 was produced in the same manner as in Example 1.

Evaluation (1) Specific Surface Area of Cathode Material for Lithium Ion Secondary Battery The specific surface areas of the cathode materials for a lithium ion secondary battery of Example 1 to Example 6 and Comparative Example 1 to Comparative Example 7 were measured using a specific surface area meter (trade name: BELSORP-mini, manufactured by MicrotracBEL Corp.) and a BET method by means of nitrogen ($N_2$) adsorption. In addition, on the basis of these measurement results, the contents of carbon per specific surface area of the cathode material for a lithium ion secondary battery were computed. The results are shown in Table 1.

(2) Crystallite Diameter of Cathode Material for Lithium Ion Secondary Battery

The crystallite diameters of the cathode materials for a lithium ion secondary battery of Example 1 to Example 6 and Comparative Example 1 to Comparative Example 7 were computed from the Scherrer's equation using the full width at half maximum and the diffraction angle (2θ) of a diffraction peak of a (020) plane in a powder X-ray diffraction pattern obtained by X-ray diffraction measurement in which an X-ray diffractometer (trade name: RINT2000, manufactured by Rigaku Corporation) was used. The results are shown in Table 1.

(3) Amount of Carbon in Cathode Material for Lithium Ion Secondary Battery

The amounts of carbon in the cathode materials fora lithium ion secondary battery of Example 1 to Example 6 and Comparative Example 1 to Comparative Example 7 were measured using a carbon analyzer (trade name: EMIA-220V, manufactured by Horiba Ltd.). The results are shown in Table 1.

(4) Particle Size Distribution (D10 and D90) of Cathode Material for Lithium Ion Secondary Battery The particle size distribution (the particle diameter (D10) at a cumulative volume percentage of 10% by volume in the volume particle size distribution of secondary particles and the particle diameter (D90) at a cumulative volume percentage of 90% by volume in the volume particle size distribution of secondary particles) of the cathode materials for a lithium ion secondary battery of Example 1 to Example 6 and Comparative Example 1 to Comparative Example 7 were measured using a laser diffraction/scattering particle size distribution analyzer (trade name: LA-950, manufactured by Horiba, Ltd.). The results are shown in Table 1.

(5) Thickness of Carbonaceous Film in Cathode Material for Lithium Ion Secondary Battery Three hundred places on the surfaces of the primary particles present on the surfaces of the secondary particles in the cathode materials for a lithium ion secondary battery of Example 1 to Example 6 and Comparative Example 1 to Comparative Example 7 were observed using a field-emission transmission electron microscope (trade name: HF2000, manufactured by Hitachi High-Technologies Corporation), and the average values of the thicknesses O of the carbonaceous films at 300 measurement points on the surfaces of the primary particles present in a range of 0.3 μm or less from the outermost surfaces of the secondary particles were obtained.

In addition, powders of the cathode materials for a lithium ion secondary battery of Example 1 to Example 6 and Comparative Example 1 to Comparative Example 7 were dispersed and solidified in resins. After that, the powder-containing resins were worked to thin films having a thickness of approximately 200 μm at an accelerated voltage of 40 kV using a focused ion beam working-low-acceleration scanning electron microscope observation device (Crossbeam540), thereby obtaining observation test bodies. Three hundred places on the surfaces of the primary particles present in the vicinity of the centers of the secondary particles were observed using a field-emission transmission electron microscope, and the average values of the thicknesses I of the carbonaceous films at 300 measurement points on the surfaces of the primary particles present in a range of 0.3 μm or less from the centers of the secondary particles were obtained.

In addition, from the average values of the thicknesses O of the carbonaceous films and the average values of the thicknesses I of the carbonaceous films, the ratios (O/I) between the average values of the thicknesses of the carbonaceous films were obtained. The results are shown in Table 1.

(6) Capacity Retention of Lithium Ion Secondary Battery

The capacity retentions of a lithium ion secondary battery of Example 1 to Example 6 and Comparative Example 1 to Comparative Example 7 were evaluated.

On the lithium ion secondary batteries of Example 1 to Example 4 and Comparative Example 1 to Comparative Example 4, constant-current charging was carried out at an ambient temperature of 25° C. at a current value of 1 CA until the voltages of the cathodes reached 4.3 V with respect to the equilibrium voltage of Li, and, after the voltages reached 4.3 V, constant-voltage charging was carried out until the current values reached 0.1 CA. Subsequently, after a one-minute break, constant-current discharging of 1 CA was carried out at an ambient temperature of 25° C. until the voltages of the cathodes reached 2.5 V with respect to the equilibrium voltage of Li. This test was repeated 500 cycles, and the ratios of the discharge capacities at the 500th cycle to the discharge capacities at the first cycle were considered as the capacity retentions. The results are shown in Table 2.

On the lithium ion secondary batteries of Example 5 and Example 6 and Comparative Example 5 to Comparative Example 7, constant-current charging was carried out at an ambient temperature of 25° C. at a current value of 1 CA until the voltages of the cathodes reached 4.2 V with respect to the equilibrium voltage of Li, and, after the voltages reached 4.2 V, constant-voltage charging was carried out until the current values reached 0.1 CA. Subsequently, after a one-minute break, constant-current discharging of 1 CA was carried out at an ambient temperature of 25° C. until the voltages of the cathodes reached 2.5 V with respect to the equilibrium voltage of Li. This test was repeated 500 cycles, and the ratios of the discharge capacities at the 500th cycle to the discharge capacities at the first cycle were considered as the capacity retentions. The results are shown in Table 2.

(7) Low-Temperature Output Characteristics of Lithium Ion Secondary Battery

The low-temperature output characteristics of the cathode materials for a lithium ion secondary battery of Example 1 to Example 6 and Comparative Example 1 to Comparative Example 7 were evaluated.

In Example 1 to Example 4 and Comparative Example 1 to Comparative Example 4, constant-current charging was carried out at an ambient temperature of 25° C. at a current value of 1 CA until the voltages of the cathodes reached 4.3 V with respect to the equilibrium voltage of Li, and, after the voltages reached 4.3 V, constant-voltage charging was carried out until the current values reached 0.1 CA. Subsequently, after a one-minute break, constant-current discharging of 1 CA was carried out at an ambient temperature of 25° C. until the voltages of the cathodes reached 2.5 V with respect to the equilibrium voltage of Li, thereby obtaining 25° C. discharge capacities. After that, constant-current charging was carried out at an ambient temperature of 25° C. at a current value of 1 CA until the voltages of the cathodes reached 4.3 V with respect to the equilibrium voltage of Li, and, after the voltages reached 4.3 V, constant-voltage charging was carried out until the current values reached 0.1 CA. Subsequently, after a one-minute break, constant-current discharging of 1 CA was carried out at an ambient temperature of 0° C. until the voltages of the cathodes reached 2.5 V with respect to the equilibrium voltage of Li, thereby obtaining 0° C. discharge capacities. Values obtained by dividing these 0° C. discharge capacities by 25° C. discharge capacities were considered as the low-temperature output characteristics. The results are shown in Table 2.

In Example 5 and Example 6 and Comparative Example 5 to Comparative Example 7, constant-current charging was carried out at an ambient temperature of 25° C. at a current value of 1 CA until the voltages of the cathodes reached 4.2 V with respect to the equilibrium voltage of Li, and, after the voltages reached 4.2 V, constant-voltage charging was carried out until the current values reached 0.1 CA. Subsequently, after a one-minute break, constant-current discharging of 1 CA was carried out at an ambient temperature of 25° C. until the voltages of the cathodes reached 2.5 V with respect to the equilibrium voltage of Li, thereby obtaining 25° C. discharge capacities. After that, constant-current charging was carried out at an ambient temperature of 25° C. at a current value of 1 CA until the voltages of the cathodes reached 4.2 V with respect to the equilibrium voltage of Li, and, after the voltages reached 4.2 V, constant-voltage charging was carried out until the current values reached 0.1 CA. Subsequently, after a one-minute break, constant-current discharging of 1 CA was carried out at an ambient temperature of 0° C. until the voltages of the cathodes reached 2.5 V with respect to the equilibrium voltage of Li, thereby obtaining 0° C. discharge capacities. Values obtained by dividing these 0° C. discharge capacities by 25° C. discharge capacities were considered as the low-temperature output characteristics. The results are shown in Table 2.

(8) Satisfaction of Both Capacity Retention and Low-Temperature Output Characteristics of Lithium Ion Secondary Battery Cases in which both the capacity retention and the low-temperature output characteristics of the lithium ion secondary battery were 80% or more were evaluated as "A", cases in which both the capacity retention and the low-temperature output characteristics of the lithium ion secondary battery were 75% or more were evaluated as "B", cases in which both the capacity retention and the low-temperature output characteristics of the lithium ion secondary battery were 70% or more were evaluated as "C", and cases in which one of the capacity retention and the low-temperature output characteristics of the lithium ion secondary battery were less than 70% were evaluated as "D". The results are shown in Table 2.

TABLE 1

| | Composition of cathode active material | Specific surface area [m²/g] | Amount of carbon [% by mass] | Content of carbon per specific surface area [mg/m²] | Average value of thicknesses O of carbonaceous film at 300 points [nm] | Average value of thicknesses I of carbonaceous film at 300 points [nm] | Ratio (O/I) (between average values) of thicknesses of carbonaceous [-] | D10 [um] | D90 [um] | Crystallite diameter [nm] |
|---|---|---|---|---|---|---|---|---|---|---|
| Example 1 | $LiFe_{0.245}Mn_{0.70}Mg_{0.05}Co_{0.005}PO_4$ | 20.3 | 1.92 | 0.95 | 1.77 | 2.03 | 0.87 | 4.4 | 17.8 | 67 |
| Example 2 | $LiFe_{0.245}Mn_{0.70}Mg_{0.05}Co_{0.005}PO_4$ | 20.5 | 1.95 | 0.95 | 1.81 | 1.98 | 0.91 | 3.9 | 16.8 | 64 |
| Example 3 | $LiFe_{0.245}Mn_{0.70}Mg_{0.05}Co_{0.005}PO_4$ | 19.9 | 1.91 | 0.96 | 1.82 | 1.96 | 0.93 | 4.1 | 16.9 | 71 |
| Example 4 | $LiFe_{0.245}Mn_{0.70}Mg_{0.05}Co_{0.005}PO_4$ | 21.6 | 1.89 | 0.88 | 1.88 | 1.95 | 0.97 | 4.2 | 18.2 | 62 |
| Comparative Example 1 | $LiFe_{0.245}Mn_{0.70}Mg_{0.05}Co_{0.005}PO_4$ | 20.3 | 1.89 | 0.93 | 1.54 | 2.08 | 0.74 | 4.1 | 18.5 | 66 |
| Comparative Example 2 | $LiFe_{0.245}Mn_{0.70}Mg_{0.05}Co_{0.005}PO_4$ | 21.1 | 1.97 | 0.93 | 2.03 | 1.89 | 1.07 | 3.9 | 17.4 | 64 |
| Comparative Example 3 | $LiFe_{0.245}Mn_{0.70}Mg_{0.05}Co_{0.005}PO_4$ | 20.7 | 1.95 | 0.94 | 2.18 | 1.79 | 1.22 | 3.7 | 18.9 | 65 |
| Comparative Example 4 | $LiFe_{0.245}Mn_{0.70}Mg_{0.05}Co_{0.005}PO_4$ | 20.0 | 1.89 | 0.95 | 1.79 | 1.89 | 0.95 | 0.3 | 34.2 | 69 |
| Example 5 | $LiFePO_4$ | 12.9 | 1.08 | 0.84 | 1.87 | 2.12 | 0.88 | 4.6 | 20.1 | 86 |
| Example 6 | $LiFePO_4$ | 12.4 | 1.03 | 0.83 | 1.97 | 2.03 | 0.97 | 4.4 | 21.4 | 89 |
| Comparative Example 5 | $LiFePO_4$ | 12.5 | 1.04 | 0.83 | 1.82 | 2.39 | 0.76 | 4.7 | 19.9 | 87 |
| Comparative Example 6 | $LiFePO_4$ | 12.3 | 1.06 | 0.86 | 2.21 | 1.99 | 1.11 | 4.8 | 20.7 | 82 |
| Comparative Example 7 | $LiFePO_4$ | 12.7 | 1.06 | 0.83 | 1.94 | 2.01 | 0.96 | 0.2 | 27.5 | 84 |

TABLE 2

| | Composition of cathode active material | First time capacity [mAh/g] | Capacity retention [%] | Low-temperature output characteristic 0° C./25° C. [%] | Satisfaction of both capacity retention and low-temperature output characteristics |
|---|---|---|---|---|---|
| Example 1 | LiFe$_{0.245}$Mn$_{0.70}$Mg$_{0.05}$CO$_{0.005}$PO$_4$ | 132 | 75.4 | 80.3 | B |
| Example 2 | LiFe$_{0.245}$Mn$_{0.70}$Mg$_{0.05}$CO$_{0.005}$PO$_4$ | 135 | 77.2 | 82.4 | B |
| Example 3 | LiFe$_{0.245}$Mn$_{0.70}$Mg$_{0.05}$CO$_{0.005}$PO$_4$ | 136 | 80.4 | 81.2 | A |
| Example 4 | LiFe$_{0.245}$Mn$_{0.70}$Mg$_{0.05}$CO$_{0.005}$PO$_4$ | 132 | 79.5 | 78.4 | B |
| Comparative Example 1 | LiFe$_{0.245}$Mn$_{0.70}$Mg$_{0.05}$CO$_{0.005}$PO$_4$ | 131 | 64.3 | 81.1 | D |
| Comparative Example 2 | LiFe$_{0.245}$Mn$_{0.70}$Mg$_{0.05}$CO$_{0.005}$PO$_4$ | 129 | 78.2 | 69.3 | D |
| Comparative Example 3 | LiFe$_{0.245}$Mn$_{0.70}$Mg$_{0.05}$CO$_{0.005}$PO$_4$ | 104 | 77.5 | 67.4 | D |
| Comparative Example 4 | LiFe$_{0.245}$Mn$_{0.70}$Mg$_{0.05}$CO$_{0.005}$PO$_4$ | 124 | 72.4 | 71.6 | C |
| Example 5 | LiFePO$_4$ | 134 | 78.2 | 82.1 | B |
| Example 6 | LiFePO$_4$ | 136 | 83.4 | 81.1 | A |
| Comparative Example 5 | LiFePO$_4$ | 122 | 69.7 | 79.2 | D |
| Comparative Example 6 | LiFePO$_4$ | 106 | 77.2 | 67.4 | D |
| Comparative Example 7 | LiFePO$_4$ | 126 | 72.1 | 73.5 | C |

When Example 1 to Example 4 and Comparative Example 1 to Comparative Example 3 are compared to each other using the results of Table 1 and Table 2, it was confirmed that, in Example 1 to Example 4 in which the ratios (O/I) between the average values of the thicknesses of the carbonaceous films were set to 0.86 to 0.97, both the capacity retentions and the low-temperature output characteristics could be satisfied compared to Comparative Example 1 in which the ratio (O/I) between the average values of the thicknesses of the carbonaceous film was set to 0.74, Comparative Example 2 in which the ratio (O/I) between the average values of the thicknesses of the carbonaceous film was set to 1.07, and Comparative Example 3 in which the ratio (O/I) between the average values of the thicknesses of the carbonaceous film was set to 1.22.

In addition, when Example 1 to Example 4 and Comparative Example 4 are compared to each other using the results of Table 1 and Table 2, it was confirmed that, in Example 1 to Example 4 in which the particle diameters D10 were set to 3.9 μm to 4.4 μm and the particle diameters D90 were set to 16.8 μm to 18.2 μm, both the capacity retentions and the low-temperature output characteristics could be satisfied compared to Comparative Example 4 in which the particle diameter D10 was set to 0.3 μm and the particle diameter D90 was set to 34.2 μm.

In addition, when Example 5 and Example 6 and Comparative Example 5 and Comparative Example 6 are compared to each other using the results of Table 1 and Table 2, it was confirmed that, in Example 5 in which the ratio (O/I) between the average values of the thicknesses of the carbonaceous film was set to 0.88 and Example 6 in which the ratio (O/I) between the average values of the thicknesses of the carbonaceous film was set to 0.97, both the capacity retentions and the low-temperature output characteristics could be satisfied compared to Comparative Example 5 in which the ratio (O/I) between the average values of the thicknesses of the carbonaceous film was set to 0.76 and Comparative Example 6 in which the ratio (O/I) between the average values of the thicknesses of the carbonaceous film was set to 1.11.

In addition, when Example 5 and Example 6 and Comparative Example 7 are compared to each other using the results of Table 1 and Table 2, it was confirmed that, in Example 5 and Example 6 in which the particle diameters D10 were set to 4.4 μm to 4.6 μm and the particle diameters D90 were set to 20.1 μm to 21.4 μm, both the capacity retentions and the low-temperature output characteristics could be satisfied compared to Comparative Example 7 in which the particle diameter D10 was set to 0.2 μm and the particle diameter D90 was set to 27.5 μm.

The electrode material for a lithium ion secondary battery of the present invention includes the LFMP active material and the carbonaceous film that coats the surface of the LFMP active material, the particle diameter D10 at a cumulative volume percentage of 10% by volume in the volume particle size distribution of the secondary particles formed by agglomerating the primary particles is 0.5 μm or more, the particle diameter D90 at a cumulative volume percentage of 90% by volume in the volume particle size distribution of the secondary particles formed by agglomerating the primary particles is 25 μm or less, and, regarding the carbonaceous film present on the surfaces of the primary particles, the ratio (O/I) of the average value of the thicknesses I of the carbonaceous film on the surfaces of the primary particles present in the range of 0.3 μm or less from the center of the secondary particle at 300 measurement points to the average value of the thicknesses O of the carbonaceous film on the surfaces of the primary particles present in the range of 0.3 μm or less from the outermost surface of the secondary particle at 300 measurement points is 0.85 or more and less than 1.00, and thus, in spite of a large change in the crystal volume in association with the charge and discharge reaction of the LFMP active material, it is possible to hold the contact between the primary particles, maintain the electron conductivity, and hold the charge and discharge capacity even in a low-temperature environment. Therefore, it is possible to apply the electrode material for a lithium ion secondary battery of the present invention to next-generation secondary batteries from which a higher voltage, a higher energy density, higher load characteristics, and higher-speed charge and discharge characteristics are expected, and, in the case of next-generation secondary batteries, the effects are extremely strong.

The invention claimed is:

1. An electrode material for a lithium ion secondary battery, comprising:
    secondary particles which are formed by agglomerating primary particles and include a carbonaceous film that coats the primary particles,
    wherein
    the primary particles consist of an electrode active material represented by General Formula LiFe$_x$Mn$_{1-w-x-y}$Mg$_y$A$_w$PO$_4$ (here, A represents at least one selected from the group consisting of Co, Ni, Zn, Al, Ga, Ca, and Ba, $0.00 \leq w \leq 0.02$, $0.05 \leq x \leq 1.00$, and $0.00 \leq y \leq 0.10$);
    a secondary particle formed by agglomerating the primary particles,
wherein a particle diameter D10 which is a particle diameter corresponding to a cumulative volume percentage of 10% by volume in a volume particle size distribution of secondary particles is 0.5 µm or more,
    a particle diameter D90 which is a particle diameter corresponding to a cumulative volume percentage of 90% by volume in the volume particle size distribution of the secondary particles is 25 µm or less, and
    regarding the carbonaceous film present on surfaces of the primary particles, a ratio (O/I) of an average value of thicknesses O of the carbonaceous film, which is formed on the surfaces of the primary particles which present in a range of 0.3 µm or less from an outermost surface of the secondary particle and is measured at 300 measurement points, to an average value of thicknesses I of the carbonaceous film, which is formed on the surfaces of the primary particles which present in a range of 0.3 µm or less from a center of the secondary particle and is measured at 300 measurement points, is 0.85 or more and less than 1.00.

2. The electrode material for a lithium ion secondary battery according to claim 1, wherein a crystallite diameter is 40 nm or more and 150 nm or less.

3. The electrode material for a lithium ion secondary battery according to claim 1, wherein an amount of carbon per specific surface area is 0.4 mg/m$^2$ or more and 1.8 mg/m$^2$ or less.

4. An electrode for a lithium ion secondary battery, comprising:
    an electrode current collector; and
    an electrode mixture layer formed on the electrode current collector,
    wherein the electrode mixture layer includes the electrode material for a lithium ion secondary battery according to claim 1.

5. A lithium ion secondary battery comprising:
    the electrode for a lithium ion secondary battery according to claim 4.

6. The electrode material for a lithium ion secondary battery according to claim 1, wherein the primary particle as an electrode active material is represented by General Formula LiFexMn1-w-x-yMgyAwPO4 (here, A represents at least one selected from the group consisting of Co, Ni, Zn, Al, Ga, Ca, and Ba, $0.00 \leq w \leq 0.02$, $0.05 \leq x \leq 1.00$, and $0.00 \leq y \leq 0.10$).

7. The electrode material for a lithium ion secondary battery according to claim 1, wherein the primary particle as an electrode active material is represented by General Formula LiFexMn1-w-x-yMgyAwPO4 (here, A represents at least one selected from the group consisting of Co and Zn, $0.003 \leq w \leq 0.02$, $0.05 \leq x \leq 1.00$, and $0.00 \leq y \leq 0.10$).

8. The electrode material for a lithium ion secondary battery according to claim 1, wherein specific surface area of the electrode material is 7 m2/g or more and 35 m2/g or less.

9. The electrode material for a lithium ion secondary battery according to claim 1, wherein specific surface area of the electrode material is 12.4 m2/g or more and 21.6 m2/g or less.

10. The electrode material for a lithium ion secondary battery according to claim 1, wherein the particle diameter D10 of the secondary particles is 1.0 µm or more and 8.0 µm or less.

11. The electrode material for a lithium ion secondary battery according to claim 1, wherein the particle diameter D90 of the secondary particles is 8 µm or more and 22 µm or less.

12. The electrode material for a lithium ion secondary battery according to claim 1, wherein the particle diameter D10 of the secondary particles is 3.9 µm or more and 4.6 µm or less, and the particle diameter D90 of the secondary particles is 16.8 µm or more and 21.4 µm or less.

13. The electrode material for a lithium ion secondary battery according to claim 1, wherein the average value of thicknesses O of the carbonaceous film on the surfaces of the primary particles present in a range of 0.3 µm or less from an outermost surface of the secondary particle at 300 measurement points is 1.77 nm or more and less than 1.97 nm.

14. The electrode material for a lithium ion secondary battery according to claim 1, wherein the average value of thicknesses I of the carbonaceous film on the surfaces of the primary particles present in a range of 0.3 µm or less from a center of the secondary particle at 300 measurement points is 1.95 nm or more and less than 2.12 nm.

15. The electrode material for a lithium ion secondary battery according to claim 1, wherein the ratio (O/I) is 0.87 or more and less than 0.97.

16. The electrode material for a lithium ion secondary battery according to claim 1, wherein a crystallite diameter of the electrode material is 64 nm or more and 89 nm or less.

17. The electrode material for a lithium ion secondary battery according to claim 1, wherein content of carbon of the electrode material is 1.03 to 1.95% by mass.

18. The electrode material for a lithium ion secondary battery according to claim 1, wherein an amount of carbon per specific surface area of the electrode material is 0.4 mg/m2 or more and 1.8 mg/m2 or less.

19. The electrode material for a lithium ion secondary battery according to claim 1, wherein the amount of carbon per specific surface area of the electrode material is 0.83 mg/m2 or more and 0.96 mg/m2 or less.

20. An electrode material for a lithium ion secondary battery, comprising:
    secondary particles which are formed by agglomerating primary particles and include a carbonaceous film that coats the primary particles,
    wherein
    the primary particles consist of an electrode active material represented by General Formula LiFexMn1-w-x-yMgyAwPO4 (here, A represents at least one selected from the group consisting of Co, Ni, Zn, Al, Ga, Ca, and Ba, $0.00 \leq w \leq 0.02$, $0.05 \leq x \leq 1.00$, and $0.00 \leq y \leq 0.10$);
    a particle diameter D10 which is a particle diameter corresponding to a cumulative volume percentage of 10% by volume in a volume particle size distribution of the secondary particles is 0.5 µm or more, a particle diameter D90 which is a particle diameter corresponding to a cumulative volume percentage of 90% by volume in the volume particle size distribution of the secondary particles is 25 µm or less, and regarding the carbonaceous film present on surfaces of the primary particles, a ratio (O/I) of an average value of thicknesses O of the carbonaceous film, which is formed on the surfaces of the primary particles which present in a range of 0.3 µm or less from an outermost surface of the secondary particle and is measured at 300 measurement points, to an average value of thicknesses I of the carbonaceous film, which is formed on the surfaces of the primary particles which present in a range of 0.3 µm or less from a center of the secondary particle and is measured at 300 measurement points is 0.85 or more and less than 1.00, the particle diameter D10 of the secondary particles is 3.9 µm or more and 4.6 µm or less, and the particle diameter D90 of the secondary particles is 16.8 µm or more and 21.4 µm or less.

* * * * *